3,200,303
TIMING CONTROL UNITS
James T. Maxwell, Dallas, Tex., assignor to Telsco Industries, Dallas, Tex., a corporation of Texas
Filed Oct. 9, 1961, Ser. No. 143,670
3 Claims. (Cl. 317—142)

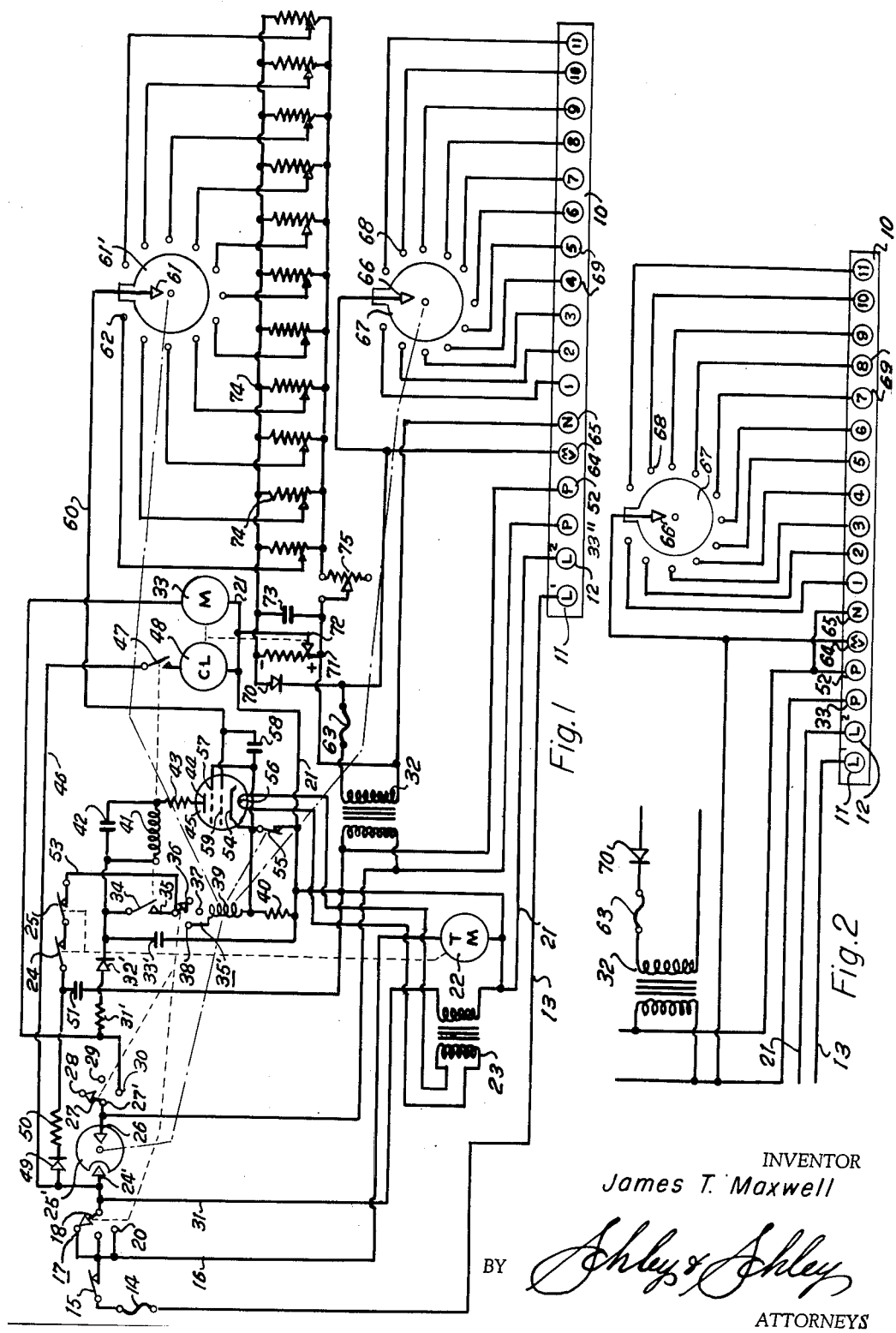
INVENTOR
James T. Maxwell
BY Ashley & Ashley
ATTORNEYS

# United States Patent Office 3,200,303
Patented Aug. 10, 1965

This invention relates to new and useful improvement in timing control units.

There are now in use many lawn and grounds sprinkling systems of rather considerable expanse and which include many sprinkling stations or sections, and additional large systems of this type are daily being installed. Due to restrictions resultant from the number of springling heads or nozzles which may be properly operated at one time because of available water pressure as well as available size of piping, it is normally not possible or practical to operate the entire sprinkling system at one time. Accordingly, such systems are operated in a sequential fashion with the lawn or grounds being divided into a number of areas or sections, and only one section being sprinkled or watered at a time, followed by watering of the successive sections. Of course, such sprinkling or watering of successive sections may readily be carried out through the use of manually operated switches which in turn, control solenoid valves which admit water under pressure to the several sprinkler sections, but there is an increasing demand for automatic control units for operating these extensive sprinkler systems. The individual sprinkling sections may vary somewhat depending upon their sizes and locations, that is, whether they are in grass areas, flower bed areas, shrubbery areas, and the like, and it is not only desirable to provide means for automatically switching the sprinkling from one section to the next and successively through all of the sections, but also to be able to control the period of time for which each individual section is watered or sprinkled. Thus, it may be preferable and most economical to water one section ten minutes, another fifteen minutes, another eight minutes, and so forth. In addition, the time of the day in which the sprinkling is carried out is of importance and may vary geographically, but usually is fairly early in the morning after sunrise. Still further, in addition to the hour or time of day at which the sprinkling operation is commenced, it is desirable to be able to vary the sprinkling schedule in accordance with the time of year so that sprinkling is carried out only on certain selected days.

It is, therefore, one object of this invention to provide an improved sprinkling system control unit by means of which the operator can select the day or days of the week upon which sprinkling is to be done, the hour at which the sprinkling operation is to be commenced, and the length of time each section of the grounds or lawn is to be sprinkled.

It is a principal object of the invention to provide an improved sprinkling system control unit in which an electronic tube is employed for controlling the switching of the sprinkling from one station or section to the next station or section, and in which the duration of sprinkling for each station or section is controlled by biasing the electronic tube and progressively driving the cathode thereof increasingly negative until the tube reaches its firing potential, at which time it triggers a sequence of operations switching the control unit so as to terminate the watering of the first section within the desired period of time and switching the sprinkling operation to the next succeeding operation, each section being individually adjustable as to tube bias for time control purposes.

It is a further object of the invention to provide an improved lawn sprinkling control unit in which not only the individual sprinkling stations or sections may be controlled, but also in which master valves for the entire sprinkling system may be opened and closed, pumps placed in operation for delivering water to the sprinkling system from a lake or river or other reservoir, or for boosting the available water pressure from city water mains and delivery of the sprinkling water under such increased pressure to outlying stations.

An additional object of the invention is to provide an improved sprinkling system control unit by means of which any desirable number of sprinkling stations may be operated sequentially, each being subject to individual time control, and in which the controlling solenoid valves of each station or section may be operated with commercial line voltage or with reduced voltage as may be desired.

Yet another object of the invention is to provide an improved timing control device which may be employed upon lawn sprinkling systems or for the sequential remote control or providing of signals to other devices subject to functioning upon reception of an electrical impulse, which may be operated manually, semi-automatically or automatically, and in which certain of the sequential steps or signals may be set for zero timing so as to result effectively in the skipping of that step or sequence.

Although the timing control unit is particularly adapted for use with lawn sprinkling systems, it is readily apparent that it may be employed for other similar sequential timing operations.

Other and more particular objects will be readily apparent from a reading of the following description.

A construction designed to carry out the invention will be hereinafter described, together with other features of the invention.

The invention will be more readily understood from a reading of the following specification and by reference to the accompanying drawing, wherein examples of the invention are shown, and wherein:

FIG. 1 is a wiring diagram of a timing control unit constructed in accordance with this invention, and FIG. 2 is a wiring diagram of a modification of the portion of the unit supplying energizing electric current to the section solenoid valves.

In drawings, the numeral 10 designates a terminal strip having thereon a plurality of terminals which will be subsequently described. The first pair of terminals, 11 and 12, are power supply terminals to which a suitable power supply such as electric power at 110 volts 60 cycle, A.C. may be connected. A lead 13 extends from terminal 11 through a fuse 14 and a clutch limit switch 15 to a "switched" or "Hot" A.C. conductor 16 and the contacts of a single-pole, triple-throw, center-off switch 17. As will appear more fully, when the switch arm 18 of the switch 17 is in engagement with the upper contact 19, the unit is in manual operation, and when the arm 18 is in engagement with the lower contact 20, the unit is in automatic operation.

The unswitched or so-called common lead 21 extends from terminal 12 through a timer or clock 22 to lead 16, through the primary side of a cathode heater transformer 23 to the arm 18 of switch 17. Thus, any time the switch 15 is closed, the timer or clock 22 is energized, and any time the switch 15 is closed and the switch 17 is in other than its center-off position, the cathode heater transformer 23 is energized. The clock or timer 22 may be of any suitable or desirable type such as are readily available on the market which through manually adjustable and positionable pins or other suitable elements is adapted to close a first switch on a certain day or days of the week, and to close a second substantially identical switch at certain hours of the selected day or days and to hold both switches closed for a predetermined period of time sufficient for the sprinkler control unit to initiate properly its cycle. These switches are shown in FIG. 1 of the drawings at 24 and 25 and are indicated as being operated by the clock or timer 22.

The switch arm 18 is connected to the contact 24′ of one wafer 25′ of a gang rotary switch, the brush 26 of which is connected to the switch arm 27 of a second single-pole, triple-throw switch 27′ having a manual contact 28 not connected to anything, a center-off position 29, and an automatic contact 30. The brush 26 is also connected through a conductor 31 to one side of the primary winding of a power supply transformer 32 and to a pump terminal 33″ on the terminal strip 10. The automatic contact 30 is connected through a resistor 31′ to a rectifying diode 32′, and also to one side of a cycling motor 33, the opposite side of which is connected to the common lead 21. The output side of the diode 32′ is connected through a condenser 33′ with the common lead 21 and in parallel therewith to the armature 34 of a normally open relay switch having a contact 35 connected to a third single-pole, triple-throw switch 35′ having a manual contact 36 not connected to anything, a center-off contact 37, and an automatic contact 38 connected through a rotary solenoid coil 39 and a resistor 40 to the common lead. Desirably, all three single-pole, triple-throw switches 17, 27′ and 35′ are coupled together in gang fashion so as to be operated simultaneously and in unison.

The output of the diode 32′ is also connected to one end of a relay coil 41, and through a condenser 42 to the opposite end of the coil 41 as well as through a resistor 43 to the anode 44 of a gas filled, tetrode tube 45 of the thyratron type. As indicated, the coil 41 upon energization actuates the relay arm 34 to move it into engagement with contact 35.

The switch arm 18 is also connected through a conductor 46 and a normally open relay arm 47 (actuated by the coil 41) to one side of a clutch 48, the opposite side of the clutch being connected to the common conductor 21. The switch arm 18 is also connected through a rectifier diode 49 and a resistor 50 to a condenser 51 as well as the two switches 24 and 25 which are arranged in series. The opposite side of the condenser 51 is connected to the common lead 21 and to the common side of the primary winding of the transformer 32 as well as the second pump terminal 52 on the terminal strip 10.

From the series switches 24 and 25, a conductor 53 leads to the arm of switch 35′.

The thyratron tube 45 has the usual cathode 54 and a cathode heater 56 which is connected across the secondary of the cathode heater transformer 23. The cathode 54 is connected through a switch 55, adapted to be operated by energization of the coil 39, to the common lead 21, and the shield grid 57 of the thyratron tube is connected to the juncture between the cathode 54 and the switch 55 and to the juncture between the coil 39 and the resistor 40 and is also connected through a condenser 58 with the biasing grid 59 of the tube. The biasing grid 59 is further connected through a conductor 60 with the brush 61 of a second wafer 61′ of the gang rotary switch of which element 25′ is the first wafer, the second wafer 61′ being illustrated in off position and having a plurality of contacts 62 disposed therearound. One side of the secondary winding of the transformer 32, which is a step down transformer, is connected through a fuse 63 to a master valve terminal 64 and the other side to a neutral terminal 65 on the terminal strip 10 through which terminals a master valve may be operated as desired. The first side of the transformer output is also connected to the brush 66 of a third wafer 67 of the gang rotary switch of which elements 25′ and 61′ form the first and second wafers, wafer 67 having a plurality of contacts 68 adapted to be engaged in sequential fashion by the energized wafer of the switch as the latter is rotated. The contacts 68 are, in turn, connected to a plurality of terminals 69, and a plurality of remote, solenoid valves (not shown) are connected one to each of the terminals 69 and to the common neutral 65. Thus, when the switch wafer 67 is energized, as the switch rotates successively into engagement with the contacts 68, the terminals 69 are sequentially energized for opening the solenoid valves selectively and supplying spraying water under pressure to the several lawn sprinkler sections.

The switch wafer 25′, the switch wafer 61′ and the switch wafer 67 are all arranged to operate in unison and to be advanced one step upon each energization of the coil 39 as indicated by the dot-dash lines. The switch 55 is also actuated or operated by the coil 39, this switch being normally closed and being adapted to be opened when the coil 39 has a current passing therethrough.

The output side of the transformer 32 is also connected through a diode 70 across a rheostat or variable potentiometer 71 having its movable brush 72 operatively connected to the clutch 48 and motor 33 for progressive shifting of the brush across the potentiometer winding, as will be described more fully, the brush 72 also being electrically connected to the common conductor 21 and thus connected through the switch 55 to the cathode 54 of the thyratron tube 45. The diode 70 is so connected into the circuit as to cause the upper end of the winding of the potentiometer 71, as it appears in the drawing, to be negative.

A condenser 73 is connected in parallel across the winding of the potentiometer 71, and from the condenser, a plurality of adjustable rheostats or potentiometers 74 are connected in parallel through a further adjustable potentiometer 75 disposed in one of the conductors leading from the condenser 73 to the potentiometers 74. The potentiometers 74 are preferably of the circuit, adjustable type and have their brushes connected in sequential fashion to the contacts 62 of the switch wafer 61′ and hence are adapted to be selectively connected to the biasing grid 59 of the thyratron 45.

It is known that thyratron tubes have characteristic voltages at which they will fire, and that these voltages may be varied by applying selected potentials to one or more of the grids within the tube. Once the tube fires, it becomes self-conducting, of course, until the circuit is broken externally of the tube.

In the present case, the circuitry illustrated sets a selected and predetermined firing voltage for the thyratron 45, and the biasing grid 59 is utilized to vary this firing voltage and in this way determine the length of the period of time for which any one lawn sprinkling system section is in operation. The adjustable potentiometer 75 is adjusted by an amount sufficient to reduce the voltage across each of the potentiometers 74 by an amount equal to the firing potential of the tube, and each of the potentiometers 74 is adjusted on a time calibrated scale to further reduce the negative potential applied to the biasing grid 59 and thus the elapsed period of time necessary before the tube 45 fires.

In the operation of the control unit, assuming the switches 17, 27′ and 35′ to be in their automatic positions, the timer motor or clock 22 will be in operation, switches 24 and 25 will be open, switches 34 and 47 will be open and switch 55 will be closed. The diode 49 will be energized, however, and the condenser 51 will be charged thereby. Now as the clock advances to the proper day and hour for which operation of the sprinkling system has been previously set, the switches 24 and 25 will be closed in the usual fashion, it being noted that whichever of the switches is functioning as the hour switch will close each twenty-four hours, but since the day switch will not be closed, the unit will not be actuated. On the closing of both switches, however, the condenser 51 will discharge through the coil 39 thus advancing each of the wafer switches 25, 61′ and 67 one contact or one position so that a circuit is completed from the brush 66 to the first of the terminals 69, from the brush 61 to the first of the contacts 62, thus placing the first potentiometer 74 in connection with the biasing grid 59, and completing a circuit from brush 24' to brush 26 to energize the diode 32' and supply a potential to anode 44 of the thyratron 45. This action also charges the condenser 33' and starts the motor 33 which begins to advance the brush or wiper 72 of the potentiometer 71 over the winding thereof and to move the brush slowly toward the negative end of the potentiometer winding.

A pre-selected or predetermined firing potential will have been set into the tube 45 by reason of the settings of the potentiometer 75 and the particular potentiometer 74 presently connected to the biasing grid 59, and thus, a predetermined period of time will have been set into the unit, being that time required for the brush 72 of the potentiometer 71 to advance sufficiently toward the negative end of the potentiometer winding as to drive the cathode 54 sufficiently negative and cause the thyratron tube to fire. When the tube fires, an electric current is passed through the relay coil 41, closing switches 34 and 47 which permits the condenser 33' to discharge through the coil 39 and again advance the wafer switches 25, 61' and 67 an additional contact or terminal. The actuation of the coil 39 will also open the switch 55, thus ensuring the termination of the flow of current through the tube 45 and readying the tube for the next firing cycle. The closing of the switch 47 opens the clutch 48, interrupting the mechanical drive between the motor 33 and the brush 72 so that the brush may return under spring loading to its starting position, the provision of the condenser 42 making certain that the switch 47 stays closed long enough for this operation to be completed. As soon as the switches 34 and 47 open, the progressive advancement of the brush 72 over the winding of the potentiometer 71 again commences, the condenser 33' charges, and, of course, upon the de-energization of the coil 39, the switch 55 closes. The time of advance of the brush 72 will now be controlled by the setting of the second of the potentiometers 74, and the cycles accordingly repeat until the last sprinkling section has been actuated. After the watering of this last section of lawn, the last energization of the coil 39 will return all of the wafer switches to the positions illustrated in the drawings and the watering cycle will terminate until a subsequent closing of the switches 24 and 25. It is to be noted that the switches 24 and 25 need stay closed only long enough to initiate the sequence of watering cycles, after which they may open and the sequence will automatically continue to completion. It is also to be noted that the condenser 51 cannot recharge until one of the switches 24 and 25 has opened, and hence termination of the cycle is ensured.

The resistor 50 limits the current flow from the diode 49 to the coil 39 so that the coil 39 cannot be held constantly energized by direct flow of current from the diode 49. This not only would tend to burn out coil 39, but would interrupt the cycling operation. Similarly, resistor 31' limits the current flow to diode 32' so that the latter will not be burned out.

It is noted hereinbefore that the potentiometer 71 is desirably of the rotary type, and for this reason switch 15, which is a clutch motor limit switch, is suitably positioned with respect to the clutch 48 to limit the potentiometer 71 to a rotation of about 280° out of a toal of 360°.

From the foregoing, it will be seen that the wafer switch 25 is utilized for initiating current flow to the control unit and for ensuring the termination of such flow at the end of the predetermined sequence of cycles so that the unit will not continue to re-cycle. The wafer switch 61' is employed for applying differing bias potentials to the biasing grid 59 to vary and regulate the length of time required for the thyratron tube to fire and thus the period of time the unit will remain upon any one station, such variation of time being individually adjustable for each station, of course. The wafer 67 is merely switched or advanced with the wafers 25 and 61' so as to feed the output voltage of the transformer 32 to the several solenoid valves of the several lawn sprinkling sections in sequential fashion.

If desired, the unit may be modified as shown in FIG. 2 so that 110 volts alternating current is supplied to the solenoid valves rather than the alternating current output of the transformer 32 which may be of the magnitude of 25 or 26 volts. Otherwise, the system is the same as that previously described. It is also noted that conventional isolation transformers and other conventional electrical expedients may be employed as found useful or desirable.

It is pointed out that the timer clock 22 runs at all times and that the switch 17 functions primarily to cut off all power from the entire unit with the exception of the timer 22. With the switch 17 in either manual or automatic position, the diode 49 is energized to maintain the condenser 51 craged, and power is supplied to the cathode heater transformer 23 to keep the thyratron tube 45 warm and ready to operate. The charging of the condenser 51 cannot, of course, place the remainder of the unit in operation since the switches 24 and 25 will be open until the predetermined hour and day of automatic operation. Even so, when the unit is set for manual operation, the closing of the switches 24 and 25 can have no effect because the switch 35' is open, and since switch 27' will also be open, there can be no supplying of power to the diode 32' and hence to the thyratron 45.

It is to be understood that the wafers 25, 61' and 67 operate in unison, and may be shifted to successive positions either by energization of the coil 39 or by manual rotation of the switches. With the unit set for manual operation, manual rotation of the wafer 67 will close the circuit to the first contact 68 and will also establish a circuit through the wafer 25. When this is done, energy is supplied to the transformer 32 for energizing the terminals 69 successively and actuating the solenoid valves to which they are connected, and also for supplying power to the pump terminals 33'' and 52, both of these actions taking place whether the unit is in manual or automatic position. Thus, an auxiliary pump which may be drawing water from a lake or well for the sprinkling system or other use, is provided for, and at the same time, the terminals 64 and 65 are energized for opening a master solenoid valve if such is included in the system. With this arrangement, the wafer 67 may be manually advanced to any selected terminal and any desired section of the sprinkling system placed in operation for any desired period of time. Of course, after manual operation is terminated, the wafer switches should be returned to their zero positions, and if desired, the single-pole, triple-throw switches returned to automatic setting.

The unit is also subject to semi-automatic operation which is carried out by setting the unit for automatic operation and then manually advancing the wafers 25, 61' and 67 to the desired station, after which the control unit will automatically continue functioning to complete the remaining cycles. It is also to be noted that the potentiometers 74 may be set to a zero time position which permits the effective skipping of any one or more of the stations or steps. Thus, by setting one or more of the potentiometers 74 for zero timing, the control unit will in effect skip that station and proceed immediately to energization of the next station.

A particular embodiment of the control unit has been illustrated and described utilizing a thyratron tube for causing the unit to advance a step or station at predetermined intervals. It is to be noted that other equivalent devices may be employed in place of the thyratron tube such as a polarized relay or equivalent electrical device.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A timing control unit including a gas-filled tube having an anode and a cathode and a biasing grid, the tube being characterized by having a predetermined firing potential subject to variation by variation of a biasing potential on the tube grid, a first step switch having a plurality of stations, means for supplying electric power to the first step switch for sequential delivery to the stations thereof, a second step switch having a plurality of stations, means for delivering to the stations of the second step switch biasing potentials individually adjustable as to each station of the second step switch and as to the magnitude of the biasing potential delivered to each station of the second step switch, means for placing the biasing potentials of the stations of the second step switch on the tube grid, a potentiometer having a positive end and a negative end and a contact movable between the positive and negative ends, the contact being connected to the tube cathode, means for moving the potentiometer contact at a constant speed from the positive end of the potentiometer toward the negative end thereof to drive the tube cathode more negative until the tube fires whereby the biasing potential placed on the tube grid from the stations of the second step switch determines the time required at each station for the tube to fire and hence the time electric power is supplied to the stations of the first step switch, and means responsive to the firing of the tube to advance both step switches and terminate current flow through the tube.

2. A timing control unit as set forth in claim 1 and a power supply control operated in unison with the step switches by the means responsive to the firing of the tube to advance the step switches for terminating the operation of the step switches after a predetermined series of advances thereof.

3. A timing control unit as set forth in claim 1 wherein the means for delivering to the stations of the second step switch biasing potentials are adjustable potentiometers.

References Cited by the Examiner
UNITED STATES PATENTS

| | | | |
|---|---|---|---|
| 2,461,266 | 2/49 | Gay | 317—151 X |
| 2,695,976 | 11/54 | Hasenkamp | 317—139 X |
| 2,803,814 | 8/57 | Bloser | 317—139 X |

SAMUEL BERNSTEIN, *Primary Examiner.*